United States Patent Office 3,238,174
Patented Mar. 1, 1966

3,238,174
OXALATE SALTS FOR CREEP-CURRENT STRENGTH IMPROVEMENT IN EPOXY RESIN PRODUCTS
Fritz Weigel, Plockendorf, near Schwabach, Germany, assignor to Siemens-Schuckertwerke Aktiengesellschaft, Berlin-Siemensstadt, Germany, a corporation of Germany
No Drawing. Filed Aug. 15, 1961, Ser. No. 131,505
Claims priority, application Germany, Aug. 17, 1960, S 69,971
3 Claims. (Cl. 260—37)

My invention relates to the manufacture of products from epoxy resins for use as electrically insulating materials. Epoxy resins are being used for many electrical purposes as casting resins, varnishes and in other forms. However, the employment of these particular resins is restricted in those cases where an appreciable resistance to creepage current is required, because the majority of epoxy substances, particularly when mixed with filler substances, are not sufficiently resistant to creepage currents.

Various methods have been proposed to improve creepage-current strength, for example, the use of aluminum oxide hydrate as a filler material. This filler, however, has the disadvantage that it cannot be added to epoxy resins in sufficiently large quantities because it greatly increases the viscosity and thereby excessively reduces the castability of the resin. On the other hand, it is desired to work as great a quantity as possible of filler material into the resin in order to increase the mechanical strength and to reduce te shrinkage during hardening to a minimum.

It has also been proposed to increase creepage-current strength of filled epoxy-resin products by using cycloaliphatic acid anhydrides as hardening agents. Such combinations, however, have the disadvantage that they lose their creep-current strength more or less rapidly upon thermal aging.

According to my invention, I have discovered that the above-mentioned disadvantages are avoided by using calcium oxalate, strontium oxalate and/or barium oxalate as filler substances for epoxy resins. It has been found that the use of calcium oxalate is particularly advantageous. The oxalates of calcium, strontium and barium can be worked into the resins in large quantities without excessively increasing the viscosity, and without depriving the products made therefrom of their creep-current strength upon thermal aging.

The filler substances used according to the invention can also be employed in mixture with each other as well as in mixture with non-active filler substances such as quartz meal, slate meal, porcelain meal and others.

Products made according to the invention and exhibiting increased creep-current strength are applicable for numerous electrical purposes. They are particularly useful, for example, for embedding electrical devices and their components and they may also be employed as coatings as well as adhesives.

The invention will be illustrated by the examples described below. Since the testing methods employed in these examples are in accordance with certain German standards, it appears necessary to first define the terminology and to briefly describe the testing method referred to in the examples. It should be understood, however, that the same German standards provide for testing by a method different from the one here referred to, and that the invention is not predicated upon any particular testing method nor upon any particular unit in which the creep-current strength is measured.

"Creep current," also called "creepage current" or "leakage current," is an electric current which flows between electrically conductive parts under voltage on the surface of an insulating body due to the presence of conductive impurities. "Creepage track" is the visible consequence of a local, predominantly thermal decomposition of insulating materials under the effect of creepage current. "Creep-current strength" is the resistivity of an insulating material to formation of creepage tracks.

For measuring creep-current strength by the dripping method according to German Standards DIN 53480, two electrodes are placed against the specimen surface, 4 mm. spaced from each other, at a contact pressure of about 100 g. A voltage of 380 volt, 50 c.p.s., is applied. An electrically conductive aqueous solution, for example 0.5% of an organic sodium salt of a naphthalene sulfonic acid, commercially obtainable as Erkantol BXD, and 0.5% NaCl, having a specific conductance of 10,000 $\mu$s./cm., is supplied in drops midway between the electrodes in intervals of 30 seconds and individual drop quantities of 30 mm.$^3$. An overload relay is connected across the electrodes. The relay is set to be released at 3 amps after about 2 seconds. The number of drops required to effect such release is counted. (For further details, reference may be had to the German Standards DIN 53480, published October 1955, by Beuth-Vertrieb G.m.b.H., Berlin and Cologne, Germany.)

*Units of creep-current strength.*—The above-mentioned standards distinguish between the following 5 steps of strength: T1, 1 to 3 drops; T2, 4 to 10 drops; T3, 11 to 30 drops; T4, 31 to 100 drops; T5, more than 100 drops.

Suitable as epoxy resins are all liquid and solid resins on the basis of bisphenol A. Furthermore aliphatic resins are derived for example from glycerine. Also applicable are resins like vinylcyclohexendioxide, diphentendioxide, dicyclopentadiendioxide and 3,4 - epoxy - 6-methyl - cyclohexylmethyl - 3,4 - epoxy - 6 - methylcyclohexylcarboxylate. Further applicable are resins on the basis of aromatic amines such as 4,4'-di-aminodiphenylmethane. All of these resins can be hardened (cured) with amines as well as with dicarboxylic acids or their anhydrides. The hardening can also be effected after the ionic polymerization with the aid of suitable catalysts, for example with $BF_3$ complexes.

*Example 1*

10 g. of a commercial solid epoxy resin (a reaction product of bisphenol A and epichlorohydrin and having an epoxy number 0.2; correponding approximately to that sold as Araldite B or Epon 1001) were heated to 140° C., and 3 g. phthalic acid anhydride were dissolved therein under good stirring. Added to this mixture were 13 g. calcium oxalate and were intimately mixed with the resin. After hardening at 140° C. for 16 hours, the creepage-current strength was measured in accordance with the German Standards DIN 53480. The strength was found to be in step T5.

*Example 2*

Added to 13 g. of a resin-handener mixture prepared according to Example 1, was a mixture of 2.6 g. quartz meal and 10.4 g. calcium oxalate. After hardening in accordance with Example 1, the creepage-current strength was tested. It was found to be T5.

*Example 3*

Added to 13 g. of a resin-hardener mixture prepared in accordance with Example 1, were 13 g. strontium oxalate. After hardening the mixture also in accordance with Example 1, the creepage-current strength was tested. It was found that the specimen was more strongly eroded than when using calcium oxalate. However, no conducting creepage track occurred after 100 drops, resulting in a creep-current strength of T5.

*Example 4*

Added to 13 g. of the resin-hardener mixture prepared in accordance with Example 1, was a mixture of 2.6 g. quartz meal and 10.4 g. strontium oxalate. After hardening the mixture in accordance with Example 1, the creepage-current strenth was tested. No conducting creepage track was found after 100 drops. Creep-current strength T5.

*Example 5*

A mixture of 20 g. of a liquid diepoxy resin (epoxy number 0.51) and 16 g. phthalic anhydride was heated to 150° C. After good stirring, a mixture of 14.4 g. quartz meal and 57.6 g. calcium oxalate was added. After hardening for 16 hours at 140° C., the creepage-current strength was tested. The creep strength was found to be T5.

For the purpose of comparison, I offer the following example:

*Example 6*

10 g. of a commercial epoxy resin (epoxy number 0.2) were heated to 140° C. 3 g. phthalic acid anhydride were dissolved therein under good stirring. Added to this mixture were 13 g. quartz meal and intimately mixed with the resin. After hardening for 16 hours at 140° C., the creep-current strength was tested in accordance with the Standard DIN 53480. A creepage-current track was formed after 3 to 4 drops (step T1 to T2).

The quantity of additive may be varied over wide ranges, the exact quantity being determined by the starting viscosity of the resin-hardener mixture. Liquid resins can be filled to a higher degree than solid resins. Also to be considered is wherther thick layers are to be cast or whether thin interspaces are to be filled. The latter make it necessary to use filled resins of lesser viscosity.

Obviously many modifications and variations of the present invention are possible in the light of the above teachings. It is therefore to be understood that within the scope of the appended claims, the invention may be practiced otherwise than as specifically described.

I claim:

1. The method of producing filled epoxy-resin products of increased creep-current strength, which comprises preparing a mixture consisting essentially of an epoxy resin and a hardener, admixing thereto a sufficient amount of at least one substance selected from the group consisting of calcium oxalate, strontium oxalate and barium oxalate to provide increased creep-current strength, and hardening the resulting mixture.

2. The method of producing filled epoxy-resin product of increased creep-current strength, which comprises a cured mixture of preparing a first mixture consisting essentially of an epoxy resin and a hardener, preparing a second mixture of inactive filler substance with a sufficient amount of at least one substance selected from the group consisting of calcium oxalate, strontium oxalate, and barium oxlate to provide increased creep-current strength, mixing the said first and said second mixtures together and hardening the resulting mixed mass.

3. Hardened epoxy resin products of increased creep-current strength, which comprise epoxy resin, hardener and a sufficient amount of a filler selected from the group consisting of calcium oxalate, strontium oxalate and barium oxalate to provide increased creep-current strength.

References Cited by the Examiner

UNITED STATES PATENTS

| | | | |
|---|---|---|---|
| 2,500,449 | 3/1950 | Bradley | 260—47 XR |
| 2,934,505 | 4/1960 | Gurgiolo | 260—2 |
| 2,947,338 | 8/1960 | Reid et al. | 260—37 XR |
| 3,006,891 | 10/1961 | Nikles | 260—47 |

MORRIS LIEBMAN, *Primary Examiner.*

MILTON STERMAN, *Examiner.*